(12) United States Patent
Tsai (10) Patent No.: US 12,292,958 B2
(45) Date of Patent: May 6, 2025

(54) METHOD FOR MANAGING PASSWORDS FOR BASIC INPUT/OUTPUT SYSTEM AND BASEBOARD MANAGEMENT CONTROLLER

(71) Applicant: Mitac Computing Technology Corporation, Taoyuan (TW)

(72) Inventor: Wen-Ching Tsai, Taoyuan (TW)

(73) Assignee: Mitac Computing Technology Corporation, Taoyuan (TW)

( * ) Notice: Subject to any disclaimer, the term of this patent is extended or adjusted under 35 U.S.C. 154(b) by 306 days.

(21) Appl. No.: 18/180,620

(22) Filed: Mar. 8, 2023

(65) Prior Publication Data

US 2023/0315833 A1    Oct. 5, 2023

(30) Foreign Application Priority Data

Apr. 1, 2022    (TW) .................................. 111112794

(51) Int. Cl.
| | |
|---|---|
| *G06F 21/44* | (2013.01) |
| *G06F 9/4401* | (2018.01) |
| *G06F 21/57* | (2013.01) |

(52) U.S. Cl.
CPC ............ *G06F 21/44* (2013.01); *G06F 9/4403* (2013.01); *G06F 21/572* (2013.01); *G06F 2221/034* (2013.01)

(58) Field of Classification Search
CPC .. G06F 21/44; G06F 21/572; G06F 2221/034; G06F 9/4403
See application file for complete search history.

(56) References Cited

U.S. PATENT DOCUMENTS

| | | | |
|---|---|---|---|
| 2017/0185780 A1* | 6/2017 | Kao | ...................... H04L 63/102 |
| 2018/0041499 A1* | 2/2018 | Rathineswaran | ....... G06F 21/46 |

(Continued)

FOREIGN PATENT DOCUMENTS

| | | | | |
|---|---|---|---|---|
| CN | 113868710 A | * | 12/2001 | |
| CN | 108256332 A | * | 7/2018 | ............. G06F 21/46 |

(Continued)

OTHER PUBLICATIONS

Di, Qing-wei et al. CN 108256332 A (machine translation), published Jul. 6, 2018. (Year: 2018).*

(Continued)

*Primary Examiner* — Michael Simitoski
(74) *Attorney, Agent, or Firm* — MLO, a professional corp.

(57) ABSTRACT

A method for managing passwords for a BIOS and a BMC is implemented by a computer including a processor, a BMC, a platform controller hub (PCH), a first non-volatile memory and a second non-volatile memory. The BMC stores a BMC password, the first non-volatile memory stores a BIOS password, and the second non-volatile memory stores a first string and a second string. The method includes steps of: upon receiving a command for changing the BIOS password, the processor changing the BIOS password via the PCH according to the command; the processor changing the second string via the PCH to be the same as the BIOS password; the processor rebooting the computer; the BMC changing the first string via the PCH to be the same as the second string; and the BMC changing the BMC password to be the same as the first string.

20 Claims, 9 Drawing Sheets

(56) References Cited

U.S. PATENT DOCUMENTS

| | | | |
|---|---|---|---|
| 2019/0034620 A1* | 1/2019 | Khatri | G06F 21/45 |
| 2022/0284089 A1* | 9/2022 | Kanevsky | G06F 21/57 |

FOREIGN PATENT DOCUMENTS

| | | | | |
|---|---|---|---|---|
| CN | 109635561 A | * | 4/2019 | |
| CN | 109815721 A | * | 5/2019 | |
| CN | 110378101 A | * | 10/2019 | G06F 21/46 |
| CN | 111339525 B | * | 6/2022 | G06F 21/45 |

OTHER PUBLICATIONS

Qian, Hui-juan. CN 109635561 A (machine translation), published Apr. 16, 2019. (Year: 2019).*

Lan, De-li. CN 109815721 A (machine translation), published May 28, 2019. (Year: 2019).*

Li, Li-Li et al. CN 110378101 A (machine translation), published Oct. 25, 2019. (Year: 2019).*

Lu, Fei et al. CN 111339525 B (machine translation), published Jun. 7, 2022. (Year: 2022).*

Wang, Zhi-yi et al. CN 113868710 A (machine translation), published Dec. 31, 2021. (Year: 2021).*

Banik, Subrata, and Vincent Zimmer. "Spotlight on Future Firmware." Firmware Development: A Guide to Specialized Systemic Knowledge. Berkeley, CA: Apress, 2022. 1-127. (Year: 2022).*

Sundahl, Mark Jack. "Automating the basic configuration of IPMI interfaces: To reduce the risk of misconfiguration." (2020). (Year: 2020).*

* cited by examiner

FIG. 9

METHOD FOR MANAGING PASSWORDS FOR BASIC INPUT/OUTPUT SYSTEM AND BASEBOARD MANAGEMENT CONTROLLER

CROSS-REFERENCE TO RELATED APPLICATION

This application claims priority to Taiwanese Invention Patent Application No. 111112794, filed on Apr. 1, 2022.

FIELD

The disclosure relates to a method for managing passwords, and more particularly to a method for managing passwords for a basic input/output system (BIOS) and a baseboard management controller (BMC).

BACKGROUND

Generally, a server includes a basic input/output system (BIOS), a baseboard management controller (BMC), various hardware components, and various communication interfaces (e.g., Intelligent Platform Management Interface (IPMI), Redfish etc.). To allow for setting of a hardware component or a communication interface, there is one password for the BIOS (BIOS password) and another password for the BMC (BMC password); that is to say, there are a plurality of password groups that correspond respectively to multiple hardware components and communication interfaces, and each of the password groups includes a BIOS password and a BMC password.

However, the server may be maintained by different administrators, and it may be troublesome for each of the administrators to remember all of the password groups corresponding to the various hardware components and communication interfaces.

SUMMARY

Therefore, an object of the disclosure is to provide a method for managing passwords for a basic input/output system (BIOS) and a baseboard management controller (BMC) that can alleviate at least one of the drawbacks of the prior art.

According to one aspect of the disclosure, a method for managing passwords for a BIOS and a BMC is implemented by a computer including a processor, the BMC, a platform controller hub (PCH), a first non-volatile memory and a second non-volatile memory. The processor, the BMC, the first non-volatile memory and the second non-volatile memory are electrically connected to the PCH. The BMC stores a BMC password, the first non-volatile memory stores a BIOS password that is for the BIOS of the computer and that corresponds to the BMC password, and the second non-volatile memory stores a first character string corresponding to the BMC password and a second character string corresponding to the BIOS password. The method includes steps of: upon receiving a command for changing the BIOS password, the processor changing the BIOS password that is stored in the first non-volatile memory via the PCH according to the command; the processor changing the second character string that is stored in the second non-volatile memory via the PCH in a manner that the second character string is changed to be the same as the BIOS password; after changing the second character string, the processor rebooting the computer; after the computer is rebooted, the BMC changing the first character string that is stored in the second non-volatile memory via the PCH in a manner that the first character string is changed to be the same as the second character string; and the BMC changing the BMC password that is stored in the BMC to be the same as the first character string.

According to another aspect of the disclosure, a method for managing passwords for a BIOS and a BMC is implemented by a computer including a processor, the BMC, a PCH, a first non-volatile memory and a second non-volatile memory. The processor, the BMC, the first non-volatile memory and the second non-volatile memory are electrically connected to the PCH. The BMC stores a BMC password, the first non-volatile memory stores a BIOS password that is for the BIOS of the computer and that corresponds to the BMC password, and the second non-volatile memory stores a first character string corresponding to the BMC password and a second character string corresponding to the BIOS password. The method includes steps of: upon receiving a command for changing one of the BIOS password and the BMC password, the BMC, according to the command, changing the first character string and the second character string that are stored in the second non-volatile memory via the PCH, and the BMC password that is stored in the BMC in a manner that the first character string, the second character string and the BMC password are changed to be the same as each other; after changing the first character string, the second character string, and the BMC password, the processor rebooting the computer; and after the computer is rebooted, the processor changing the BIOS password that is stored in the first non-volatile memory via the PCH in a manner that the BIOS password is changed to be the same as the second character string.

According to yet another aspect of the disclosure, a method for managing passwords for a BIOS and a BMC is implemented by a computer including a processor, the BMC, a platform controller hub (PCH), a first non-volatile memory and a second non-volatile memory. The processor, the BMC, the first non-volatile memory and the second non-volatile memory are electrically connected to the PCH. The BMC stores a BMC password, the first non-volatile memory stores a BIOS password that is for the BIOS of the computer and that is the same as the BMC password, and the second non-volatile memory stores a character string. The method includes steps of: upon receiving a command for changing the BIOS password, the processor changing the BIOS password that is stored in the first non-volatile memory via the PCH according to the command; the processor changing the character string that is stored in the second non-volatile memory via the PCH in a manner that the character string is changed to be the same as the BIOS password; after changing the character string, the processor rebooting the computer; and after the computer is rebooted, the BMC changing the BMC password that is stored in the BMC to be the same as the character string.

According to a further aspect of the disclosure, a method for managing passwords for a BIOS and a BMC is implemented by a computer including a processor, the BMC, a platform controller hub (PCH), a first non-volatile memory and a second non-volatile memory. The processor, the BMC, the first non-volatile memory and the second non-volatile memory are electrically connected to the PCH. The BMC stores a BMC password, the first non-volatile memory stores a BIOS password that is for the BIOS of the computer and that is the same as the BMC password, and the second non-volatile memory stores a character string. The method includes steps of: upon receiving a command for changing one of the BIOS password and the BMC password, the BMC, according to the command, changing the character string that is stored in the second non-volatile memory via the PCH, and the BMC password that is stored in itself in a manner that the character string and the BMC password are changed to be the same; after changing the character string and the BMC password, the processor rebooting the computer; and after the computer is rebooted, the processor changing the BIOS password that is stored in the first non-volatile memory via the PCH in a manner that the BIOS password is changed to be the same as the character string.

BRIEF DESCRIPTION OF THE DRAWINGS

Other features and advantages of the disclosure will become apparent in the following detailed description of the embodiment(s) with reference to the accompanying drawings. It is noted that various features may not be drawn to scale.

DETAILED DESCRIPTION

Before the disclosure is described in greater detail, it should be noted that where considered appropriate, reference numerals or terminal portions of reference numerals have been repeated among the figures to indicate corresponding or analogous elements, which may optionally have similar characteristics.

Figure 1:
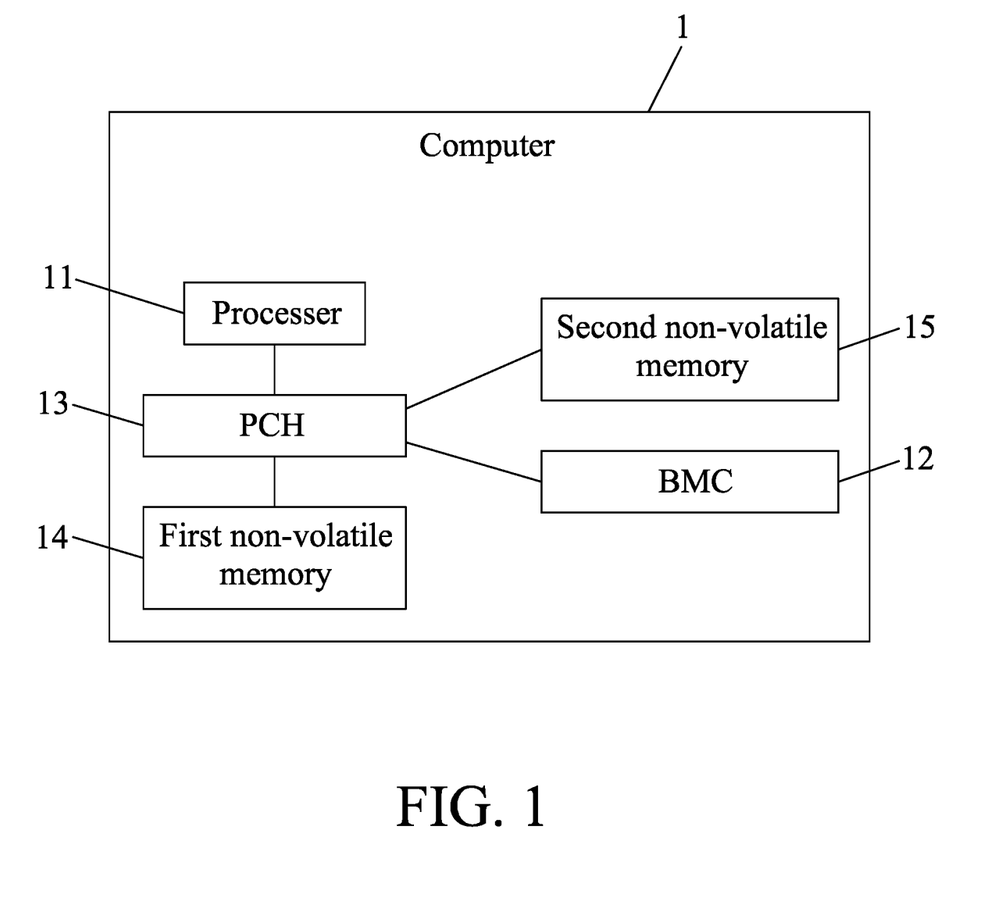
FIG. 1 is a block diagram illustrating a computer configured to implement a method for managing passwords for a basic input/output system (BIOS) and a baseboard management controller (BMC) according to an embodiment of the disclosure.

Referring to FIG. 1, a computer 1 for implementing a method for managing passwords for a basic input/output system (BIOS) and a baseboard management controller (BMC) according to an embodiment of the disclosure is illustrated. The computer 1 includes a processor 11, a BMC 12, a platform controller hub (PCH) 13, a first non-volatile memory 14 and a second non-volatile memory 15. The processor 11, the BMC 12, the first non-volatile memory 14 and the second non-volatile memory 15 are electrically connected to the PCH 13.

The computer 1 in embodiments may be, but is not limited to, a server, a personal computer or a laptop. The processor 11 may include, but not limited to, one or more of a single core processor, a multi-core processor, a dual-core mobile processor, a microprocessor, a microcontroller, a digital signal processor (DSP), a field-programmable gate array (FPGA), an application specific integrated circuit (ASIC), a radio-frequency integrated circuit (RFIC), etc.

The processor 11 is configured to read data from and write data into the first non-volatile memory 14 and the second non-volatile memory 15 via the PCH 13. The first non-volatile memory 14 stores essential operating data for the processor 11 to boot the computer 1, such as a firmware for booting the computer 1, setting data and various parameters for operating the firmware, and password(s) and account number(s) for logging in a BIOS setup menu of the computer 1. It should be noted that, in embodiments, the first non-volatile memory 14 may be, but is not limited to, a non-volatile random-access memory (NVRAM).

In one embodiment according to the disclosure, the BMC 12 stores a BMC password (i.e., the password for the BMC 12). The BMC 12 is configured to read data from and write data into the second non-volatile memory 15 via the PCH 13. The first non-volatile memory 14 stores a BIOS password that is for a BIOS of the computer 1 and that corresponds to the BMC password (i.e., the BMC password and the corresponding BIOS password together form a password group for setting a hardware component or a communication interface of the computer 1). The second non-volatile memory 15 stores a first character string corresponding to the BMC password, a second character string corresponding to the BIOS password, and a BIOS status flag. A flag value of the BIOS status flag is one of a first predetermined value and a second predetermined value that is different from the first predetermined value (i.e., the flag value of the BIOS status flag is either the first predetermined value or the second predetermined value). The first predetermine value indicates that the second character string has been changed, and the second predetermined value indicates that the second character string has not been changed. The flag value of the BIOS status flag is set to the second predetermined value by default.

Figure 2:
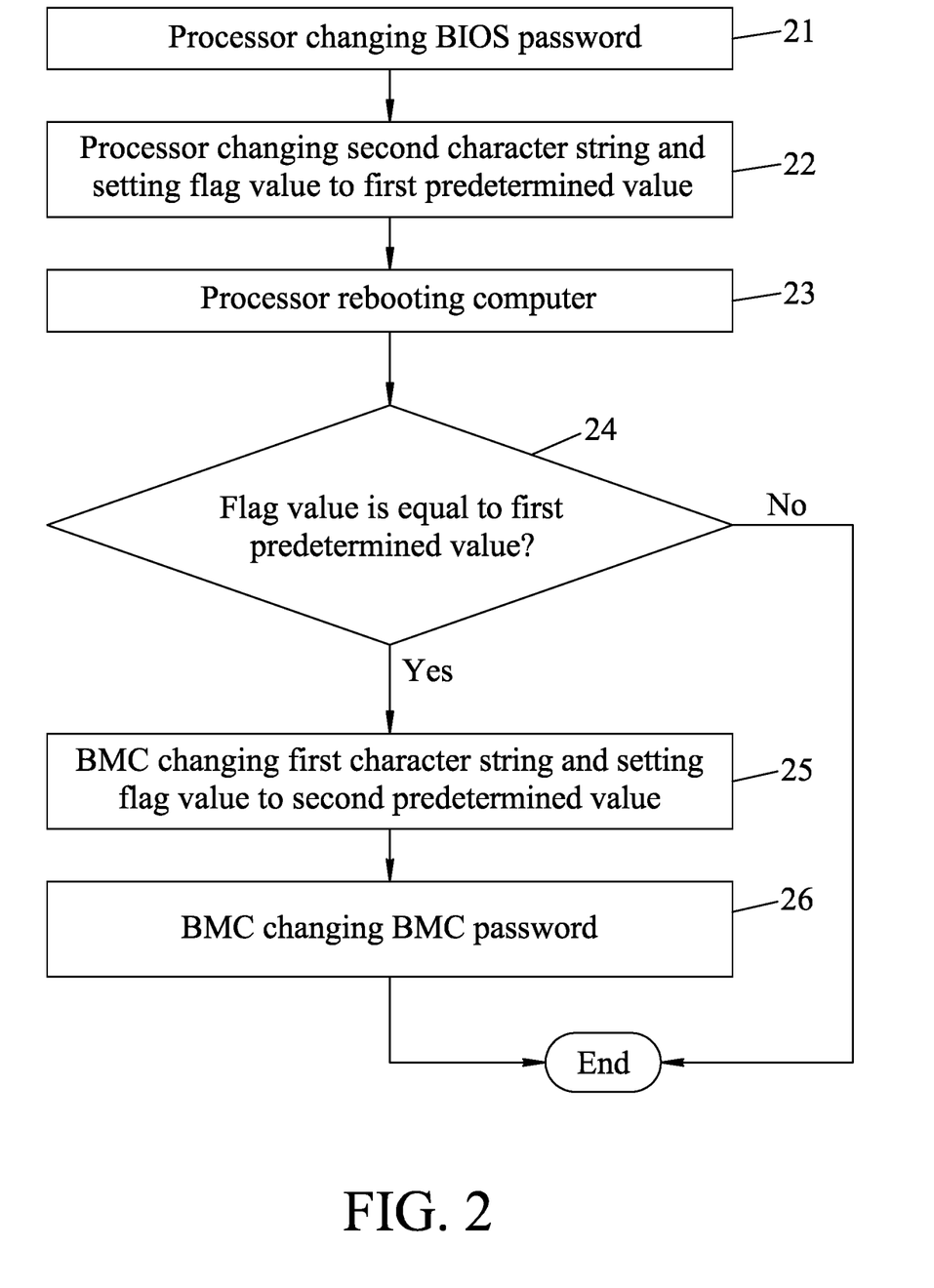
FIG. 2 is a flow chart illustrating the method for managing passwords for the BIOS and the BMC according to an embodiment of the disclosure.
Figure 3:
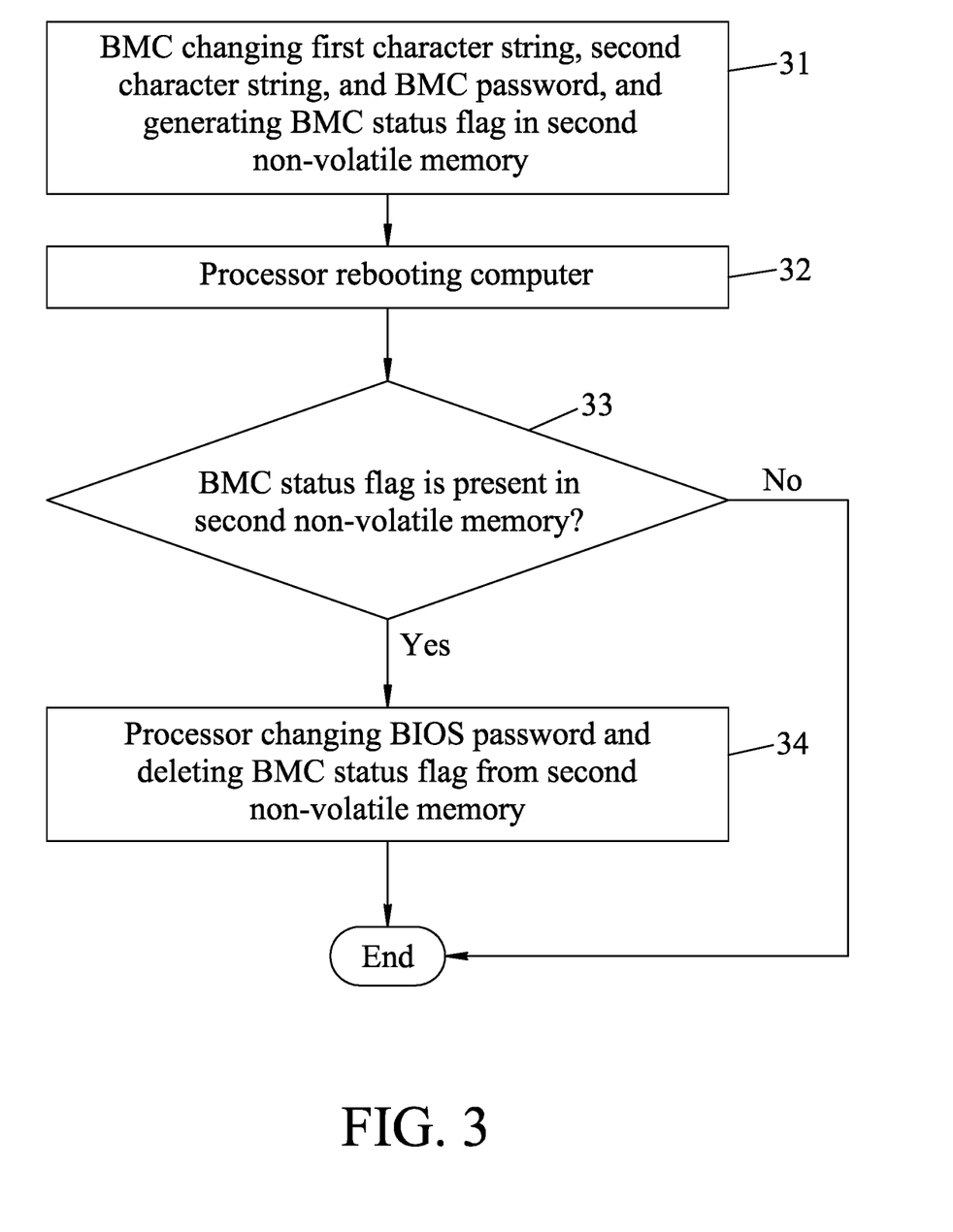
FIG. 3 is a flow chart illustrating the method for managing passwords for the BIOS and the BMC according to another embodiment of the disclosure.

According to one embodiment of the disclosure, the method for managing passwords for the BIOS and the BMC 12 is initiated by the processor 11 (see FIG. 2); according to another embodiment of the disclosure, the method for managing passwords for the BIOS and the BMC 12 is initiated by the BMC 12 (see FIG. 3).

Referring to FIG. 1 and FIG. 2, the method for managing passwords for the BIOS and the BMC 12 includes steps 21-26. In step 21, upon receiving a first command for changing the BIOS password, the processor 11 changes the BIOS password that is stored in the first non-volatile memory 14 via the PCH 13 according to the first command. It should be noted that the first command is generated by a user using the BIOS setup menu, and has a first new password to which the user wants to change the BIOS password, so that the processor 11 changes the BIOS password to be the same as the first new password.

Following step 21, in step 22, the processor 11 first accesses the BIOS password from the first non-volatile memory 14 via the PCH 13, and then changes the second character string that is stored in the second non-volatile memory 15 via the PCH 13 in a manner that the second character string is changed to be the same as the BIOS password, and sets the flag value of the BIOS status flag that is stored in the second non-volatile memory 15 to the first predetermined value via the PCH 13.

In step 23, the processor 11 reboots the computer 1. It should be noted that step 23 is implemented after step 22 in this embodiment.

In step 24, after the computer 1 is rebooted, the BMC 12 first accesses the flag value of the BIOS status flag from the second non-volatile memory 15 via the PCH 13, and then determines whether the flag value of the BIOS status flag is equal to the first predetermined value. When the BMC 12 determines that the flag value of the BIOS status flag is equal to the first predetermined value, the flow proceeds to step 25; otherwise, the method is terminated.

In some cases where the BIOS password has been changed (e.g., in step 21) before the computer 1 reboots, the flow would proceed to step 25; in other cases, the computer 1 may reboot without the BIOS password having been changed prior to the rebooting, and thus no further step is taken.

In step 25, the BMC 12 first accesses the second character string from the second non-volatile memory 15 via the PCH 13, and then changes the first character string via the PCH 13 in a manner that the first character string is changed to be the same as the second character string, and then the BMC 12 sets the flag value of the BIOS status flag that is stored in the second non-volatile memory 15 to the second predetermined value via the PCH 13.

In step 26, the BMC 12 changes the BMC password that is stored in itself to be the same as the first character string. As the result, the BIOS password, the BMC password, the first character string, and the second character string are all changed to be the same as the first new password.

It should be noted that, in some embodiments, the BIOS status flag is absent from the second non-volatile memory 15 until being generated (i.e., one bit in the second non-volatile memory 15 is set to be the BIOS status flag). In such cases, in step 22, instead of setting the flag value of the BIOS status flag to the first predetermined value, the processor 11 generates the BIOS status flag in the second non-volatile memory 15 to indicate that the BIOS password has been changed. In step 24, the BMC 12 determines whether the BIOS status flag is present in the second non-volatile memory 15 via the PCH 13. When the BMC 12 determines that the BIOS status flag is present in the second non-volatile memory 15, the flow proceeds to step 25; otherwise, the method is terminated. In step 25, instead of setting the flag value of the BIOS status flag to the second predetermined value, the BMC 12 deletes the BIOS status flag from the second non-volatile memory 15 (i.e., the bit is no longer representing the BIOS status flag) via the PCH 13. Essentially, the BIOS status flag is generally not present in the second non-volatile memory 15, and is generated for use only when the BIOS password is to be changed.

It should be further noted that, in some embodiments, the BIOS status flag is absent from the second non-volatile memory 15 and is not generated in step 22. In such cases, in step 24, the BMC 12 first accesses the first character string from the second non-volatile memory 15 via the PCH 13, and then determines whether the first character string is the same as the BMC password. When the BMC 12 determines that the first character string is different from the BMC password, the flow proceeds to step 25, where the BMC 12 first accesses the second character string from the second non-volatile memory 15 via the PCH 13, and then changes the first character string via the PCH 13 in a manner that the first character string is changed to be the same as the second character string. When the BMC 12 determines that the first character string is the same as the BMC password, the method is terminated.

Further referring to FIG. 3, according to one embodiment of this disclosure, the method for managing passwords for the BIOS and the BMC 12 is initiated by the BMC 12.

In step 31, upon receiving a second command for changing one of the BIOS password and the BMC password (i.e., changing either the BIOS password or the BMC password), the BMC 12, according to the second command, changes the first character string and the second character string that are stored in the second non-volatile memory 15 via the PCH 13 and the BMC password that is stored in itself in a manner that the first character string, the second character string and the BMC password are changed to be the same as each other. The BMC 12 generates a BMC status flag in the second non-volatile memory 15 via the PCH 13 to indicate that the BMC password has been changed. It should be noted that the second command is generated by the user through a remote computer and is sent to the BMC 12 over the Internet, and has a second new password to which the user wants to change said one of the BIOS password and the BMC password.

Figure 4:
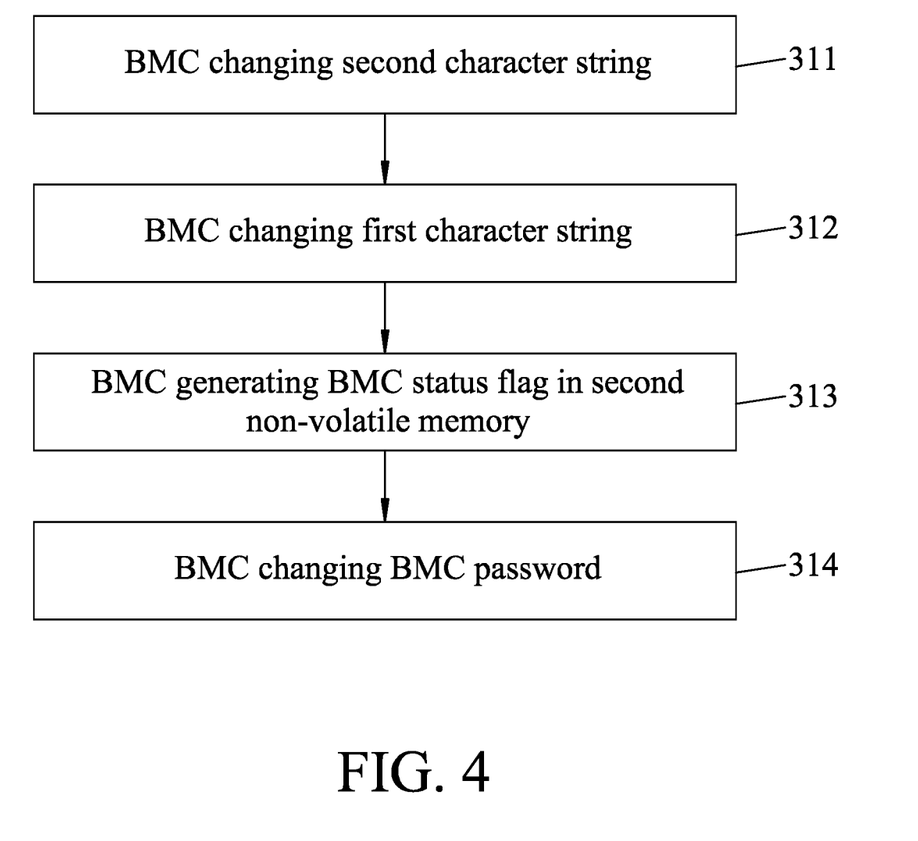
FIG. 4 is a flow chart illustrating sub-steps of a step, as shown in FIG. 3, of changing a BMC password upon receiving a command for changing a BIOS password.

Further referring to FIG. 4, when the second command is for changing the BIOS password, step 31 includes sub-steps 311 to 314.

In sub-step 311, the BMC 12 changes the second character string that is stored in the second non-volatile memory 15 via the PCH 13 according to the second command, and more specifically, the BMC 12 changes the second character string to be the same as the second new password.

After sub-step 311, the BMC 12, in sub-step 312, first accesses the second character string from the second non-volatile memory via the PCH 13, and then changes the first character string that is stored in the second non-volatile memory 15 via the PCH 13 in a manner that the first character string is changed to be the same as the second character string.

In sub-step 313, the BMC 12 generates the BMC status flag in the second non-volatile memory 15 via the PCH 13. It should be noted that sub-step 313 may not necessarily be implemented after sub-steps 311 and 312, as long as it is implemented before step 32 commences.

In sub-step 314, the BMC 12 first accesses the first character string from the second non-volatile memory 15 via the PCH 13, and then changes the BMC password that is stored in itself to be the same as the first character string that has been changed in sub-step 312.

Figure 5:
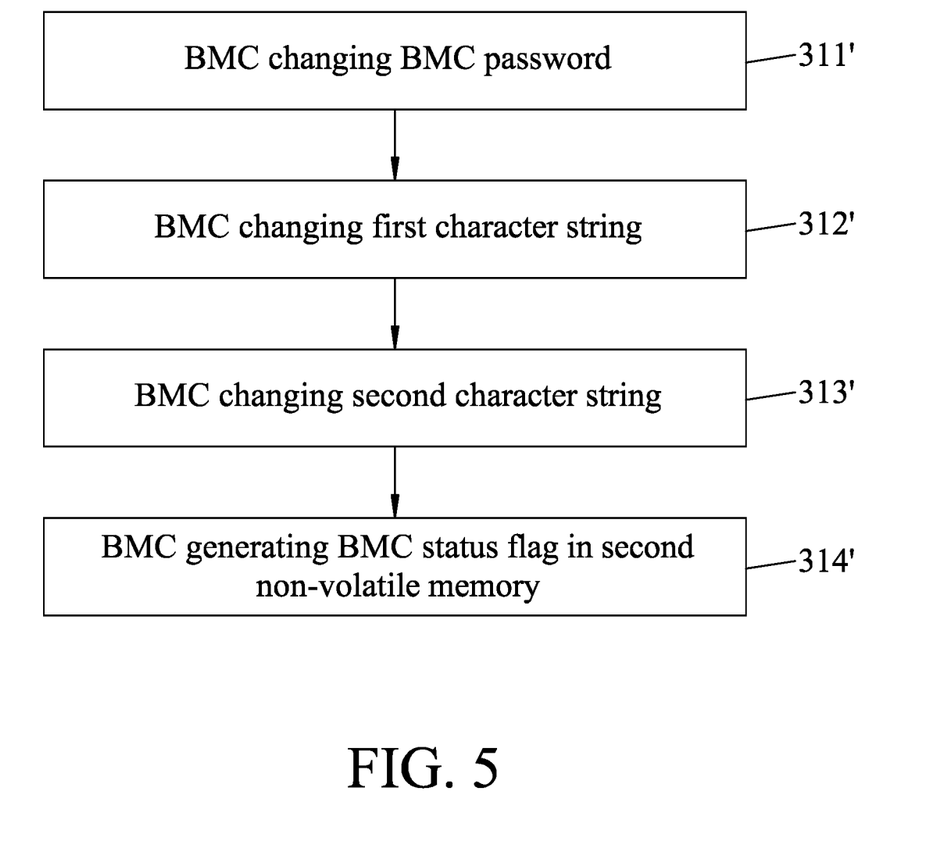
FIG. 5 is a flow chart illustrating sub-steps of the step of changing the BMC password upon receiving a command for changing the BMC password.

Further referring to FIG. 5, when the second command is for changing the BMC password, step 31 includes sub-steps 311' to 314'.

In sub-step 311', the BMC 12 changes the BMC password that is stored in itself according to the second command, and more specifically, the BMC 12 changes the BMC password to be the same as the second new password.

In sub-step 312', the BMC 12 changes the first character string that is stored in the second non-volatile memory 15 via the PCH 13 in a manner that the first character string is changed to be the same as the BMC password that has been changed in sub-step 311'.

In sub-step 313', the BMC 12 changes the second character string that is stored in the second non-volatile memory 15 via the PCH 13 in a manner that the second character string is changed to be the same as the first character string that has been changed in sub-step 312'.

In sub-step 314', the BMC 12 generates the BMC status flag in the second non-volatile memory 15 via the PCH 13.

It should be noted that sub-step 314' may not necessarily be implemented after sub-steps 311', 312' and 313', as long as it is implemented before step 32 commences.

In step 32, the processor 11 reboots the computer 1. It should be noted that step 32 is implemented after step 31 in this embodiment. It should be further noted that, after the BMC 12 changes the BMC password, the BMC 12 sends a notification to the processor 11 for notifying that the BMC password has been changed, and the processor 11, upon receiving the notification, reboots the computer 1.

In step 33, after the computer 1 is rebooted, the processor 11 determines whether the BMC status flag is present in the second non-volatile memory 15 via the PCH 13. When the processor 11 determines that the BMC status flag is present in the second non-volatile memory 15, the flow proceeds to step 34; otherwise, the method is terminated. It should be noted that in cases where the computer 1 is not rebooted after the BMC password has been changed, the processor 11 is configured to periodically determine whether the BMC status flag is present in the second non-volatile memory 15 via the PCH 13.

In some cases where the BMC password has been changed (e.g., in step 31) before the computer 1 reboots, the flow would proceed to step 34; in other cases, the computer 1 might reboot without the BMC password having been changed before the rebooting, and thus no further step is taken.

In step 34, the processor 11 first accesses the second character string from the second non-volatile memory 15 via the PCH 13, and then changes the BIOS password that is stored in the first non-volatile memory 14 via the PCH 13 in a manner that the BIOS password is changed to be the same as the second character string thus accessed, and the processor 11 deletes the BMC status flag from the second non-volatile memory 15 via the PCH 13. As the result, the BIOS password, the BMC password, the first character string, and the second character string are all changed to be the same as the second new password.

It should be noted that, in some embodiments, the BMC status flag is always present in the second non-volatile memory 15 and the BMC status flag has a flag value that is equal to one of a third predetermined value and a fourth predetermined value that is different from the third predetermined value. The third predetermined value indicates that the BMC password has been changed, and the fourth predetermined value indicates that the BMC password has not been changed. The flag value of the BMC status flag is set to the fourth predetermined value by default. In these embodiments, in step 31, instead of generating the BMC status flag in the second non-volatile memory 15, the BMC 12 sets the flag value of the BMC status flag to the third predetermined value via the PCH 13. In step 33, the processor 11 first accesses the flag value of the BMC status flag from the second non-volatile memory 15 via the PCH 13, and then determines whether the flag value of the BMC status flag is equal to the third predetermined value. When the processor 11 determines that the flag value of the BMC status flag is equal to the third predetermined value, the flow proceeds to step 34; otherwise, the method is terminated. In such cases, in step 34, instead of deleting the BMC status flag from the second non-volatile memory 15, the processor 11 sets the flag value of the BMC status flag to the fourth predetermined value via the PCH 13.

It should be further noted that, in some embodiments, the BMC status flag is not generated in step 31 (and is hence absent from the second non-volatile memory 15). In such instances, in step 33, the processor 11 first accesses the second character string from the second non-volatile memory and the BIOS password from the first non-volatile memory 14 both via the PCH 13, and then determines whether the second character string is the same as the BIOS password. When the processor 11 determines that the second character string is the same as the BIOS password, the method is terminated; otherwise, the method proceeds to step 34, where the processor 11 first accesses the second character string from the second non-volatile memory 15 via the PCH 13, and then changes the BIOS password via the PCH 13 in a manner that the BIOS password is changed to be the same as the second character string.

In one embodiment according to the disclosure, the BMC 12 stores the BMC password, the first non-volatile memory 14 stores the BIOS password that is for the BIOS of the computer 1 and that is the same as the BMC password, and the second non-volatile memory 15 stores only a third character string and the BIOS status flag. The flag value of the BIOS status flag is set to the second predetermined value by default. In this embodiment, the method for managing passwords for the BIOS and the BMC 12 may be initiated by the processor 11 (see FIG. 6) or the BMC 12 (see FIG. 7).

Figure 6:
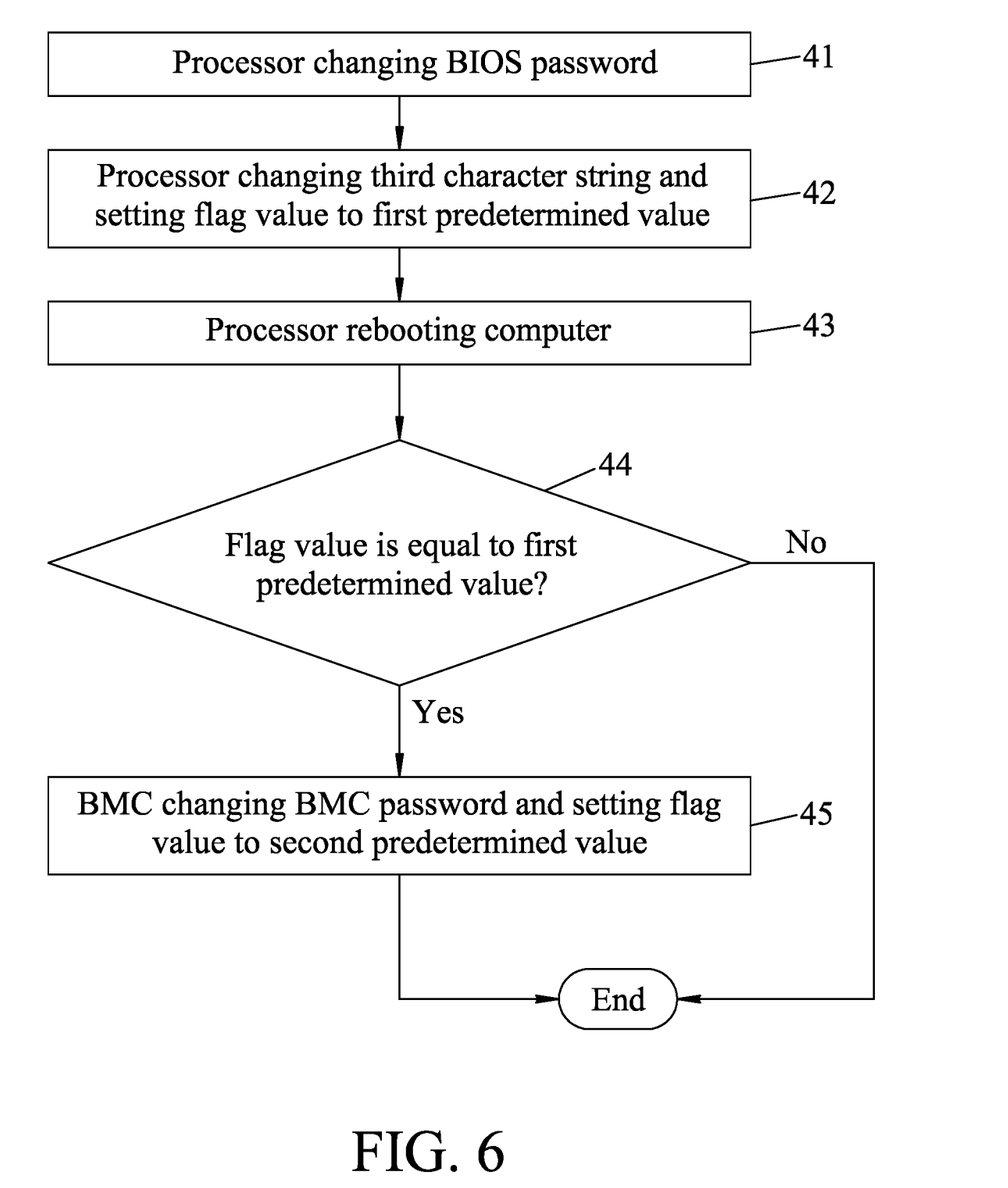
FIG. 6 is a flow chart illustrating the method for managing passwords for the BIOS and the BMC according to another embodiment of the disclosure.

Referring to FIG. 6, the method for managing passwords for the BIOS and the BMC 12 is initiated by the processor 11 and includes steps 41 to 45. In step 41, upon receiving the first command for changing the BIOS password, the processor 11 changes the BIOS password that is stored in the first non-volatile memory 14 via the PCH 13 according to the first command, so that the processor 11 changes the BIOS password to be the same as the first new password.

In step 42, the processor 11 changes the third character string that is stored in the second non-volatile memory 15 via the PCH 13 in a manner that the third character string is changed to be the same as the BIOS password that has been changed in step 41, and sets the flag value of the BIOS status flag to the first predetermined value via the PCH 13.

In step 43, the processor 11 reboots the computer 1. It should be noted that step 43 is implemented after step 42 in this embodiment.

In step 44, after the computer 1 is rebooted, the BMC 12 first accesses the flag value of the BIOS status flag from the second non-volatile memory 15 via the PCH 13, and then determines whether the flag value of the BIOS status flag is equal to the first predetermined value. When the BMC 12 determines that the flag value of the BIOS status flag is equal to the first predetermined value, the flow proceeds to step 45; otherwise, the method is terminated.

In cases where the BIOS password has been changed (e.g., in step 41) before the computer 1 reboots, the flow would proceed to step 45; in other cases, the computer 1 might reboot without the BIOS password having been changed before the rebooting, and thus no further step is taken.

In step 45, the BMC 12 first accesses the third character string from the second non-volatile memory 15 via the PCH 13, and then changes the BMC password that is stored in itself to be the same as the third character string, and the BMC 12 sets the flag value of the BIOS status flag that is stored in the second non-volatile memory 15 to the second predetermined value via the PCH 13. As the result, the BIOS password, the BMC password, and the third character string are all changed to be the same as the first new password.

It should be noted that, in some embodiments, the BIOS status flag is absent from the second non-volatile memory 15 until being generated. In such embodiments, in step 42, instead of setting the flag value of the BIOS status flag to the first predetermined value, the processor 11 generates the BIOS status flag in the second non-volatile memory 15 to indicate that the BIOS password has been changed, and in step 44, the BMC 12 determines whether the BIOS status flag is present in the second non-volatile memory 15 via the PCH 13. When the BMC 12 determines that the BIOS status flag is present in the second non-volatile memory 15, the flow proceeds to step 45, where instead of setting the flag value of the BIOS status flag to the second predetermined value, the BMC 12 deletes the BIOS status flag from the second non-volatile memory 15 via the PCH 13; otherwise, the method is terminated.

It should be further noted that, in some embodiments, the BIOS status flag is absent from the second non-volatile memory 15 and will not be generated in step 42. In these embodiments, in step 44, the BMC 12 first accesses the third character string from the second non-volatile memory 15 via the PCH 13, and then determines whether the third character string is the same as the BMC password. When the BMC 12 determines that the third character string is different from the BMC password, the flow proceeds to step 45; otherwise, the method is terminated. In these embodiments, in step 45, the BMC 12 first accesses the third character string from the second non-volatile memory 15 via the PCH 13, and then changes the BMC password that is stored in itself to be the same as the third character string.

Figure 7:
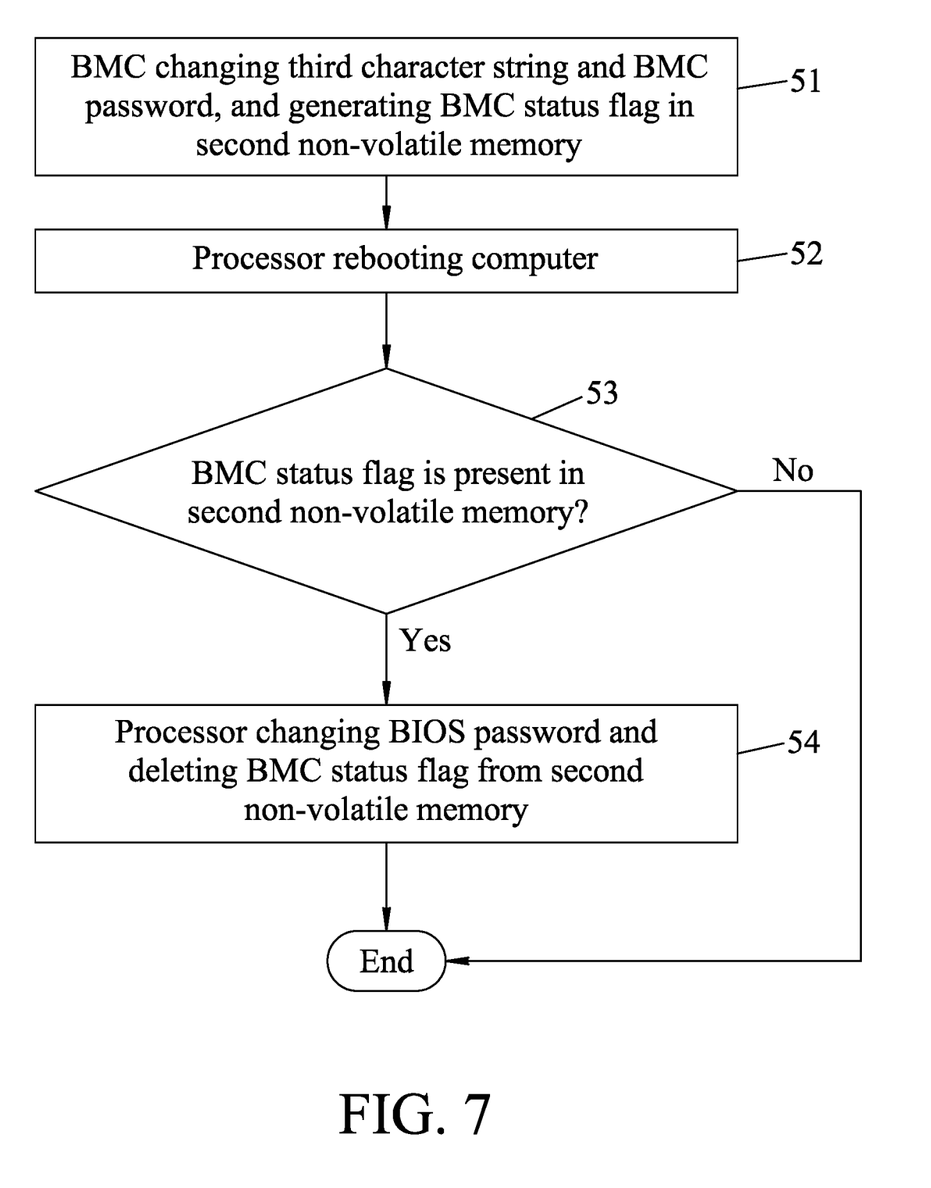
FIG. 7 is a flow chart illustrating the method for managing passwords for the BIOS and the BMC according to yet another embodiment of the disclosure.

Referring to FIG. 7, the method for managing passwords for the BIOS and the BMC 12 is initiated by the BMC 12 and includes steps 51 to 54.

In step 51, upon receiving the second command for changing one of the BIOS password and the BMC password, the BMC 12, according to the second command, changes the third character string that is stored in the second non-volatile memory 15 via the PCH 13 and the BMC password that is stored in itself in a manner that the third character string and the BMC password are changed to be the same. In addition, the BMC 12 generates the BMC status flag in the second non-volatile memory 15 via the PCH 13 to indicate that the BMC password has been changed.

Figure 8:
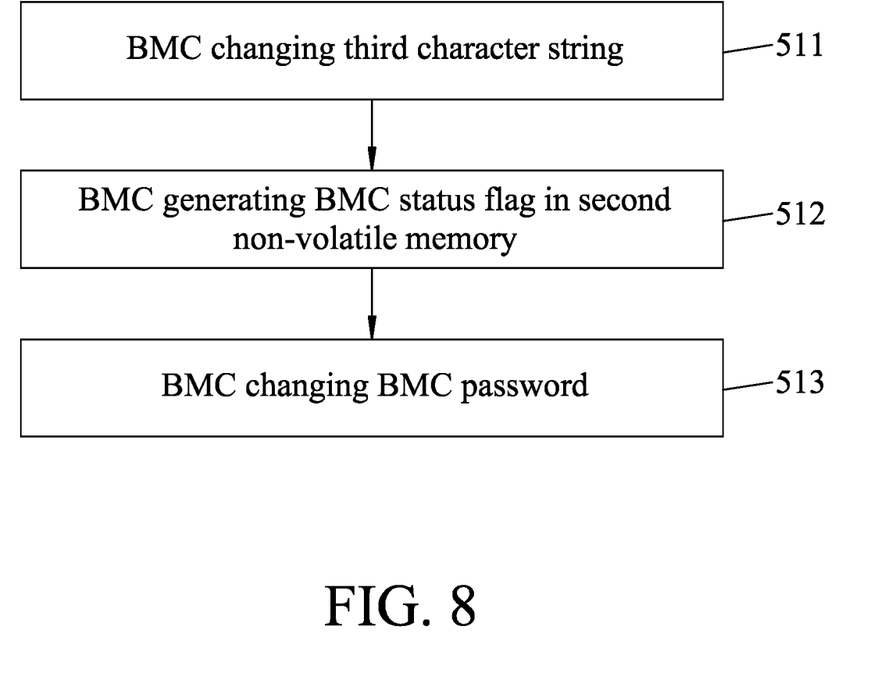
FIG. 8 is a flow chart illustrating sub-steps of a step, as shown in FIG. 7, of changing the BMC password upon receiving a command for changing a BIOS password.

Further referring to FIG. 8, when the second command is for changing the BIOS password, step 51 includes sub-steps 511 to 513.

In sub-step 511, the BMC 12 changes the third character string that is stored in the second non-volatile memory 15 via the PCH 13 according to the second command, and more specifically, the BMC 12 changes the third character string to be the same as the second new password.

In sub-step 512, the BMC 12 generates the BMC status flag in the second non-volatile memory 15 via the PCH 13. It should be noted that sub-step 512 may not necessarily be implemented after sub-step 511, as long as it is implemented before step 52 commences.

After sub-step 511, the BMC 12, in sub-step 513, first accesses the third character string from the second non-volatile memory 15 via the PCH 13, and then changes the BMC password that is stored in itself to be the same as the third character string that has been changed in sub-step 511.

Figure 9:
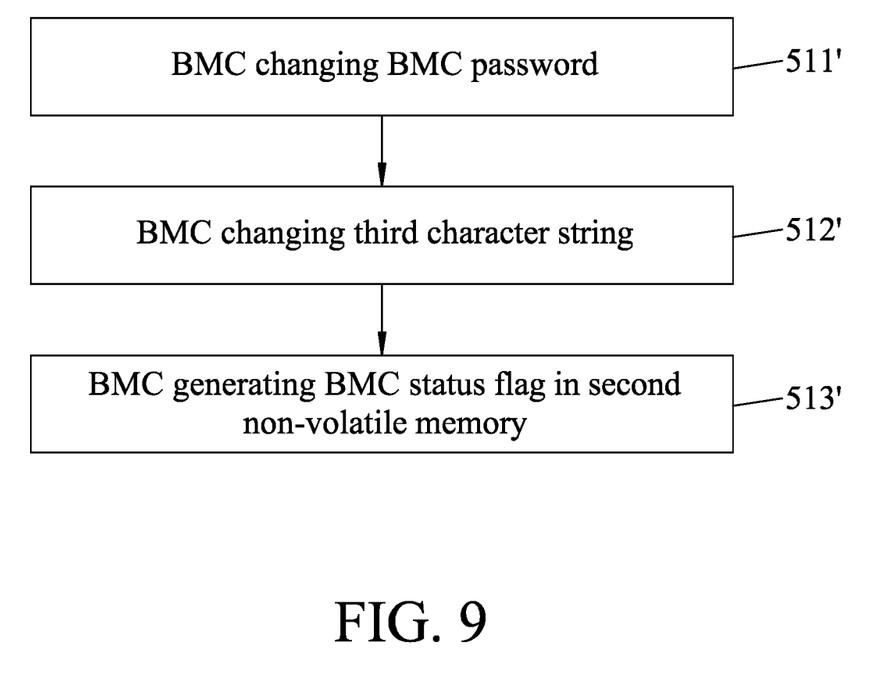
FIG. 9 is a flow chart illustrating sub-steps of the step of changing the BMC password upon receiving a command for changing the BMC password.

Further referring to FIG. 9, when the second command is for changing the BMC password, step 51 includes sub-steps 511' to 513'.

In sub-step 511', the BMC 12 changes the BMC password that is stored in itself according to the second command, and more specifically, the BMC 12 changes the BMC password to be the same as the second new password.

In sub-step 512', the BMC 12 changes the third character string that is stored in the second non-volatile memory 15 via the PCH 13 in a manner that the third character string is changed to be the same as the BMC password that has been changed in sub-step 511'.

In sub-step 513', the BMC 12 generates the BMC status flag in the second non-volatile memory 15 via the PCH 13. It should be noted that sub-step 513' may not necessarily be implemented after sub-steps 511' and 512', as long as it is implemented before step 52 commences.

In step 52, the processor 11 reboots the computer 1. It should be noted that step 52 is implemented after step 51 in this embodiment. It should be further noted that, after the BMC 12 changes the BMC password, the BMC 12 sends the notification to the processor 11 for notifying that the BMC password has been changed, and the processor 11, upon receiving the notification, reboots the computer 1.

In step 53, after the computer 1 is rebooted, the processor 11 determines whether the BMC status flag is present in the second non-volatile memory 15 via the PCH 13. When the processor 11 determines that the BMC status flag is present in the second non-volatile memory 15, the flow proceeds to step 54; otherwise, the method is terminated. It should be noted that in cases where the computer 1 is not rebooted after the BMC password has been changed, the processor 11 is configured to periodically determine whether the BMC status flag is present in the second non-volatile memory 15 via the PCH 13.

The computer 1 might reboot at any time, and in some cases, the BMC password has been changed (e.g., in step 51) before the computer 1 reboots, so the flow would proceed to step 54, and in other cases where the BMC password has not been changed before the computer 1 reboots, no further step is taken.

In step 54, the processor 11 first accesses the third character string from the second non-volatile memory 15 via the PCH 13, and then changes the BIOS password that is stored in the first non-volatile memory 14 via the PCH 13 in a manner that the BIOS password is changed to be the same as the third character string that has been changed in step 51. In addition, the processor 11 deletes the BMC status flag from the second non-volatile memory 15 via the PCH 13. As the result, the BIOS password, the BMC password, and the third character string are all changed to be the same as the second new password.

It should be noted that, in some embodiments, the BMC status flag is already present in the second non-volatile memory 15 prior to initiation of method by the BMC 12, and the flag value of the BMC status flag is set to the fourth predetermined value by default. In such cases, steps 51, 53 and 54 will be implemented differently, as will be detailed below. In step 51, instead of generating the BMC status flag in the second non-volatile memory 15, the BMC 12 sets the flag value of the BMC status flag to the third predetermined value via the PCH 13 to indicate that the BMC password has been changed. In step 53, the processor 11 first accesses the flag value of the BMC status flag from the second non-volatile memory 15 via the PCH 13, and then determines whether the flag value of the BMC status flag is equal to the third predetermined value. When the processor 11 determines that the flag value of the BMC status flag is equal to the third predetermined value, the flow proceeds to step 54; otherwise, the method is terminated. In step 54, instead of deleting the BMC status flag from the second non-volatile memory 15, the processor 11 sets the flag value of the BMC status flag to the fourth predetermined value via the PCH 13.

It should be further noted that, in some embodiments, the BMC status flag is absent from the second non-volatile memory 15 and is not generated in step 51. In such cases, steps 53 and 54 will be implemented differently, as will be detailed below. In step 53, the processor 11 first accesses the third character string from the second non-volatile memory 15 and the BIOS password that is stored in the first non-volatile memory 14 both via the PCH 13, and then determines whether the third character string is the same as the BIOS password. When the processor 11 determines that the third character string is different from the BIOS password, the flow proceeds to step 54; otherwise, the method is terminated. In step 54, the processor 11 first accesses the third character string via the PCH 13, and then changes the BIOS password via the PCH 13 in a manner that the BIOS password is changed to be the same as the third character string.

In summary, when the processor 11 changes the BIOS password that is stored in the first non-volatile memory 14 or when the BMC 12 changes the BMC password that is stored in itself, the processor 11 or the BMC 12 also changes the first character string and the second character string that are stored in the second non-volatile memory 15, which can be read by both the processor 11 and the BMC 12, and then the BMC password stored in the BMC 12 or the BIOS password stored in the first non-volatile memory 14 may be changed accordingly. In other words, when one of the BIOS password and the BMC password is being updated, the other password is simultaneously changed to be the same so the user would only have to memorize a single password to access both the BIOS and the BMC, instead of having to memorize a group of passwords which may include different passwords for the BIOS and the BMC respectively.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects; such does not mean that every one of these features needs to be practiced with the presence of all the other features. In other words, in any described embodiment, when implementation of one or more features or specific details does not affect implementation of another one or more features or specific details, said one or more features may be singled out and practiced alone without said another one or more features or specific details. It should be further noted that one or more features or specific details from one embodiment may be practiced together with one or more features or specific details from another embodiment, where appropriate, in the practice of the disclosure.

While the disclosure has been described in connection with what is(are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A method for managing passwords for a basic input/output system (BIOS) and a baseboard management controller (BMC), the method to be implemented by a computer including a processor, the BMC, a platform controller hub (PCH), a first non-volatile memory and a second non-volatile memory, the processor, the BMC, the first non-volatile memory and the second non-volatile memory being electrically connected to the PCH, the BMC storing a BMC password, the first non-volatile memory storing a BIOS password that is for the BIOS of the computer and that corresponds to the BMC password, the second non-volatile memory storing a first character string that corresponds to the BMC password and a second character string that corresponds to the BIOS password, the method comprising steps of:

upon receiving a command for changing the BIOS password, the processor changing the BIOS password that is stored in the first non-volatile memory via the PCH according to the command;

the processor changing the second character string that is stored in the second non-volatile memory via the PCH in a manner that the second character string is changed to be the same as the BIOS password;

after changing the second character string, the processor rebooting the computer;

after the computer is rebooted, the BMC changing the first character string that is stored in the second non-volatile memory via the PCH in a manner that the first character string is changed to be the same as the second character string; and the BMC changing the BMC password that is stored in the BMC to be the same as the first character string.

2. The method as claimed in claim 1, the second non-volatile memory further storing a BIOS status flag that has a flag value being one of a first predetermined value and a second predetermined value that is different from the first predetermined value, the first predetermine value indicating that the second character string has been changed, the second predetermined value indicating that the second character string has not been changed, the method further comprising steps of:

after the step of changing the second character string, the processor setting the flag value of the BIOS status flag to the first predetermined value via the PCH;

after the step of rebooting the computer, the BMC determining whether the flag value of the BIOS status flag that is stored in the second non-volatile memory is equal to the first predetermined value; and when the BMC determines that the flag value of the BIOS status flag is equal to the first predetermined value, the BMC proceeding to the step of changing the first character string and setting the flag value of the BIOS status flag that is stored in the second non-volatile memory to the second predetermined value via the PCH.

3. The method as claimed in claim 1, further comprising steps of:

after the step of changing the second character string, the processor generating a BIOS status flag in the second non-volatile memory via the PCH to indicate that the second character string has been changed;

after the step of rebooting the computer, the BMC determining whether the BIOS status flag is present in the second non-volatile memory via the PCH; and when the BMC determines that the BIOS status flag is present in the second non-volatile memory, the BMC proceeding to the step of changing the first character string and deleting the BIOS status flag from the second non-volatile memory via the PCH.

4. The method as claimed in claim 1, further comprising steps of:
   after the step of rebooting the computer, the BMC determining whether the second character string that is stored in the second non-volatile memory and the BMC password that is stored in the BMC are the same; and
   the BMC proceeding to the step of changing the first character string when the BMC determines that the second character string that is stored in the second non-volatile memory and the BMC password that is stored in the BMC are different from each other.

5. A method for managing passwords for a basic input/output system (BIOS) and a baseboard management controller (BMC), the method to be implemented by a computer including a processor, the BMC, a platform controller hub (PCH), a first non-volatile memory and a second non-volatile memory, the processor, the BMC, the first non-volatile memory and the second non-volatile memory being electrically connected to the PCH, the BMC storing a BMC password, the first non-volatile memory storing a BIOS password that is for the BIOS of the computer and that corresponds to the BMC password, the second non-volatile memory storing a first character string that corresponds to the BMC password and a second character string that corresponds to the BIOS password, the method comprising steps of:
   upon receiving a command for changing one of the BIOS password and the BMC password, the BMC, according to the command, changing the first character string and the second character string that are stored in the second non-volatile memory via the PCH, and the BMC password that is stored in the BMC in a manner that the first character string, the second character string and the BMC password are changed to be the same as each other;
   after changing the first character string, the second character string, and the BMC password, the processor rebooting the computer; and
   after the computer is rebooted, the processor changing the BIOS password that is stored in the first non-volatile memory via the PCH in a manner that the BIOS password is changed to be the same as the second character string.

6. The method as claimed in claim 5, the second non-volatile memory further storing a BMC status flag that has a flag value being one of a first predetermined value and a second predetermined value that is different from the first predetermined value, the first predetermined value indicating that the first character string has been changed, the second predetermined value indicating that the first character string has not been changed, the method further comprising steps of:
   after the step of changing the first character string, the second character string and the BMC password, the BMC setting the flag value of the BMC status flag to the first predetermined value via the PCH;
   after the step of rebooting the computer, the processor determining whether the flag value of the BMC status flag that is stored in the second non-volatile memory is equal to the first predetermined value; and
   when the processor determines that the flag value of the BMC status flag is equal to the first predetermined value, the processor proceeding to the step of changing the BIOS password and setting the flag value of the BMC status flag that is stored in the second non-volatile memory to the second predetermined value via the PCH.

7. The method as claimed in claim 5, wherein, in a case where the command is for changing the BIOS password, the step of changing the first character string, the second character string and the BMC password includes sub-steps of:
   the BMC changing the second character string that is stored in the second non-volatile memory via the PCH according to the command;
   after changing the second character string, the BMC changing the first character string that is stored in the second non-volatile memory via the PCH in a manner that the first character string is changed to be the same as the second character string;
   the BMC generating a BMC status flag in the second non-volatile memory via the PCH; and
   after changing the second character string, the BMC changing the BMC password that is stored in the BMC to be the same as the first character string,
   wherein the method further comprises steps of
      after the step of rebooting the computer, the processor determining whether the BMC status flag is present in the second non-volatile memory via the PCH, and
      when the processor determines that the BMC status flag is present in the second non-volatile memory, the processor proceeding to the step of changing the BIOS password and deleting the BMC status flag from the second non-volatile memory via the PCH.

8. The method as claimed in claim 5, wherein, in a case where the command is for changing the BMC password, the step of changing the first character string, the second character string and the BMC password includes sub-steps of:
   the BMC changing the BMC password that is stored in the BMC according to the command;
   after changing the BMC password, the BMC changing the first character string that is stored in the second non-volatile memory via the PCH in a manner that the first character string is changed to be the same as the BMC password;
   after changing the first character string, the BMC changing the second character string that is stored in the second non-volatile memory via the PCH in a manner that the second character string is changed to be the same as the first character string; and
   the BMC generating a BMC status flag in the second non-volatile memory via the PCH,
   wherein the method further comprises steps of
      after the step of rebooting the computer, the processor determining whether the BMC status flag is present in the second non-volatile memory via the PCH, and
      when the processor determines that the BMC status flag is present in the second non-volatile memory, the processor proceeding to the step of changing the BIOS password and deleting the BMC status flag from the second non-volatile memory via the PCH.

9. The method as claimed in claim 5, further comprising steps of:
   after the step of changing the first character string, the second character string and the BMC password, the BMC generating a BMC status flag in the second non-volatile memory via the PCH to indicate that the first character string has been changed;
   after the step of rebooting the computer, the processor determining whether the BMC status flag is present in the second non-volatile memory via the PCH; and
   when the processor determines that the BMC status flag is present in the second non-volatile memory, the processor proceeding to the step of changing the BIOS password and deleting the BMC status flag from the second non-volatile memory via the PCH.

10. The method as claimed in claim 5, further comprising steps of:
after the step of rebooting the computer, the processor determining whether the second character string that is stored in the second non-volatile memory and the BIOS password that is stored in the first non-volatile memory are the same; and
the processer proceeding to the step of changing the BIOS password when the processor determines that the second character string and the BIOS password are different from each other.

11. A method for managing passwords for a basic input/output system (BIOS) and a baseboard management controller (BMC), the method to be implemented by a computer including a processor, the BMC, a platform controller hub (PCH), a first non-volatile memory and a second non-volatile memory, the processor, the BMC, the first non-volatile memory and the second non-volatile memory being electrically connected to the PCH, the BMC storing a BMC password, the first non-volatile memory storing a BIOS password that is for the BIOS of the computer and that is the same as the BMC password, the second non-volatile memory storing a character string, the method comprising steps of:
upon receiving a command for changing the BIOS password, the processor changing the BIOS password that is stored in the first non-volatile memory via the PCH according to the command;
the processor changing the character string that is stored in the second non-volatile memory via the PCH in a manner that the character string is changed to be the same as the BIOS password;
after changing the character string, the processor rebooting the computer; and
after the computer is rebooted, the BMC changing the BMC password that is stored in the BMC to be the same as the character string.

12. The method as claimed in claim 11, the second non-volatile memory further storing a BIOS status flag that has a flag value being one of a first predetermined value and a second predetermined value that is different from the first predetermined value, the first predetermined value indicating that the character string has been changed, the second predetermined value indicating that the character string has not been changed, the method further comprising steps of:
after the step of changing the character string, the processor setting the flag value of the BIOS status flag to the first predetermined value via the PCH;
after the step of rebooting the computer, the BMC determining whether the flag value of the BIOS status flag that is stored in the second non-volatile memory is equal to the first predetermined value; and
when the BMC determines that the flag value of the BIOS status flag is equal to the first predetermined value, the BMC proceeding to the step of changing the BMC password and setting the flag value of the BIOS status flag that is stored in the second non-volatile memory to the second predetermined value via the PCH.

13. The method as claimed in claim 11, further comprising steps of:
after the step of changing the character string, the processor generating a BIOS status flag in the second non-volatile memory via the PCH to indicate that the character string has been changed;
after the step of rebooting the computer, the BMC determining whether the BIOS status flag is present in the second non-volatile memory via the PCH; and
when the BMC determines that the BIOS status flag is present in the second non-volatile memory, the BMC proceeding to the step of changing the BMC password and deleting the BIOS status flag from the second non-volatile memory via the PCH.

14. The method as claimed in claim 11, further comprising steps of:
after the step of rebooting the computer, the BMC determining whether the character string that is stored in the second non-volatile memory and the BMC password that is stored in the BMC are the same; and
the BMC proceeding to the step of changing the BMC password when the BMC determines that the character string and the BMC password are different from each other.

15. A method for managing passwords for a basic input/output system (BIOS) and a baseboard management controller (BMC), the method to be implemented by a computer including a processor, the BMC, a platform controller hub (PCH), a first non-volatile memory and a second non-volatile memory, the processor, the BMC, the first non-volatile memory and the second non-volatile memory being electrically connected to the PCH, the BMC storing a BMC password, the first non-volatile memory storing a BIOS password that is for the BIOS of the computer and that is the same as the BMC password, the second non-volatile memory storing a character string, the method comprising steps of:
upon receiving a command for changing one of the BIOS password and the BMC password, the BMC, according to the command, changing the character string that is stored in the second non-volatile memory via the PCH, and the BMC password that is stored in the BMC in a manner that the character string and the BMC password are changed to be the same;
after changing the character string and the BMC password, the processor rebooting the computer; and
after the computer is rebooted, the processor changing the BIOS password that is stored in the first non-volatile memory via the PCH in a manner that the BIOS password is changed to be the same as the character string.

16. The method as claimed in claim 15, the second non-volatile memory further storing a BMC status flag that has a flag value being one of a first predetermined value and a second predetermined value that is different from the first predetermined value, the first predetermined value indicating that the character string has been changed, the second predetermined value indicating that the character string has not been changed, the method further comprising steps of:
after the step of changing the character string and the BMC password, the BMC setting the flag value of the BMC status flag to the first predetermined value via the PCH;
after the step of rebooting the computer, the processor determining whether the flag value of the BMC status flag that is stored in the second non-volatile memory is equal to the first predetermined value; and
when the processor determines that the flag value of the BMC status flag is equal to the first predetermined value, the processor proceeding to the step of changing the BIOS password and setting the flag value of the BMC status flag that is stored in the second non-volatile memory to the second predetermined value via the PCH.

17. The method as claimed in claim 15, wherein, in the case where the command is for changing the BIOS password, the step of changing the character string and the BMC password includes sub-steps of:
the BMC changing the character string that is stored in the second non-volatile memory via the PCH according to the command;
the BMC generating a BMC status flag in the second non-volatile memory via the PCH; and
after changing the character string, the BMC changing the BMC password that is stored in itself to be the same as the character string,
wherein the method further comprises
after the step of rebooting the computer, the processor determining whether the BMC status flag is present in the second non-volatile memory via the PCH, and
when the processor determines that the BMC status flag is present in the second non-volatile memory, the processor proceeding to the step of changing the BIOS password and deleting the BMC status flag from the second non-volatile memory via the PCH.

18. The method as claimed in claim 15, wherein, in the case where the command is for changing the BMC password, the step of changing the character string and the BMC password includes sub-steps of:
the BMC changing the BMC password that is stored in itself according to the command;
after changing the BMC password, the BMC changing the character string that is stored in the second non-volatile memory via the PCH in a manner that the character string is changed to be the same as the BMC password; and
the BMC generating a BMC status flag in the second non-volatile memory via the PCH,
wherein the method further comprises
after the step of rebooting the computer, the processor determining whether the BMC status flag is present in the second non-volatile memory via the PCH, and
when the processor determines that the BMC status flag is present in the second non-volatile memory, the processor proceeding to the step of changing the BIOS password and deleting the BMC status flag from the second non-volatile memory via the PCH.

19. The method as claimed in claim 15, further comprising steps of:
after the step of changing the character string and the BMC password, the BMC generating a BMC status flag in the second non-volatile memory via the PCH to indicate that the character string has been changed;
after the step of rebooting the computer, the processor determining whether the BMC status flag is present in the second non-volatile memory via the PCH; and
when the processor determines that the BMC status flag is present in the second non-volatile memory, the processor proceeding to the step of changing the BIOS password and deleting the BMC status flag from the second non-volatile memory via the PCH.

20. The method as claimed in claim 15, further comprising steps of:
after the step of rebooting the computer, the processor determining whether the character string that is stored in the second non-volatile memory and the BIOS password that is stored in the first non-volatile memory are the same; and
the processer proceeding to the step of changing the BIOS password when the processor determines that the character string and the BIOS password are different from each other.

* * * * *